J. H. ELWARD.
Dry Amalgamator.
No. 55,261.          Patented June 5, 1866.
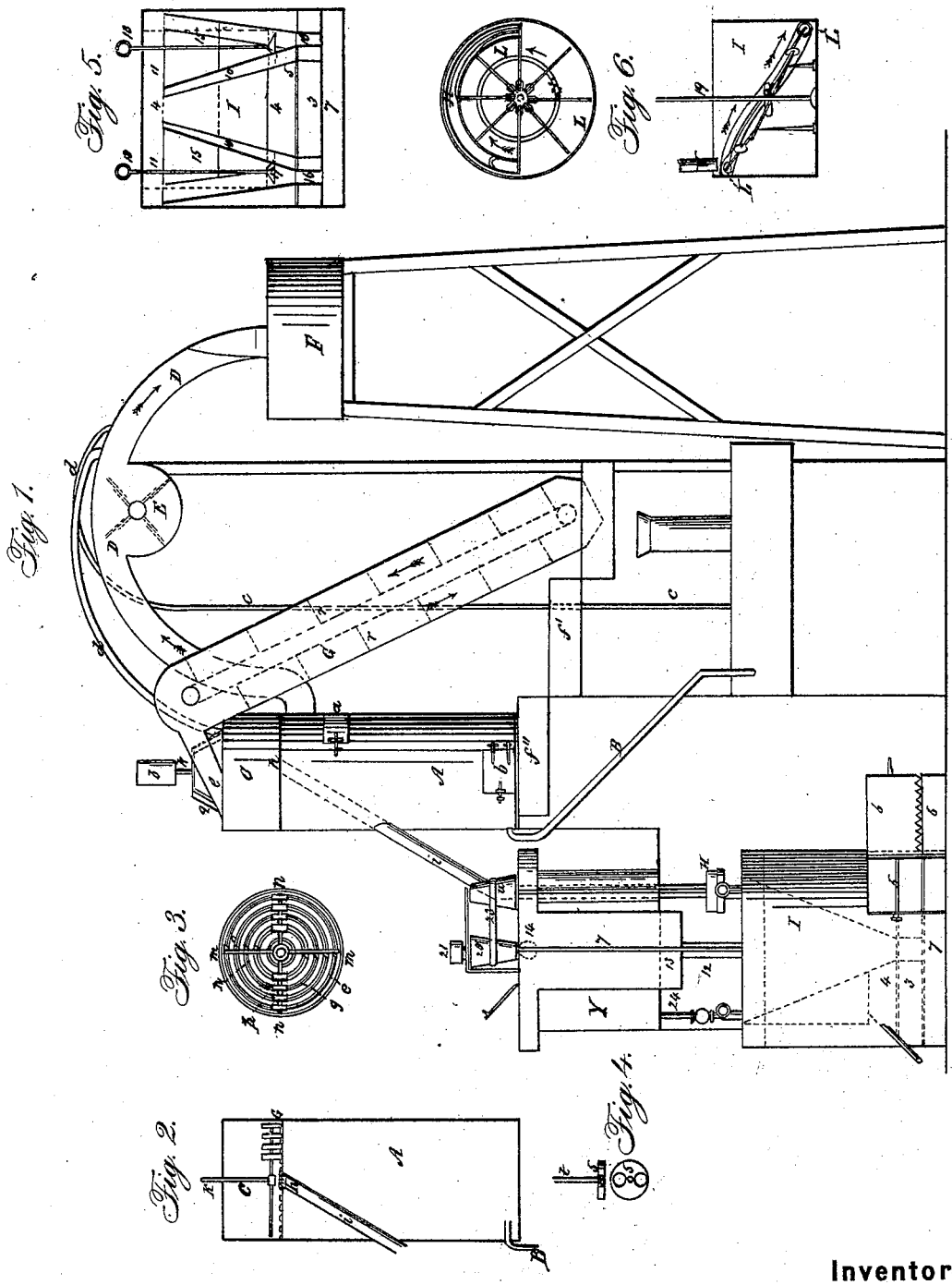
Witnesses:
Inventor:

UNITED STATES PATENT OFFICE.

JOHN H. ELWARD, OF POLO, ILLINOIS.

IMPROVED APPARATUS FOR SEPARATING METALS FROM ORES.

Specification forming part of Letters Patent No. 55,261, dated June 5, 1866.

*To all whom it may concern:*

Be it known that I, JOHN H. ELWARD, of Polo, in the county of Ogle and State of Illinois, have invented a new and useful Machine for Extracting Metals from Ores and Amalgamating them; and I do hereby declare that the following is a full, clear, and exact description of the construction and operation of the same, reference being had to the annexed drawings, making a part of this specification, in which—

Figure 1 is a view, in elevation, of my machine. Fig. 2 is a vertical section through the roaster and heater; Fig. 3, a plan view of the crushing-rollers and scrapers or rake and bottom of the heater. Fig. 4 is a plan view and elevation of the valve-plate. Fig. 5 is an elevation of the amalgamator with its shell removed; and Fig. 6 is a section through the center of the amalgamating-tub and a section of the conductors and their guide-tube.

It is the object of my invention to separate metals from ores by minutely dividing the ores through chemical and mechanical treatment and delivering them in an amalgamated condition; and to this end my invention consists in roasting the ores in a closed chamber, from which they are passed to tanks containing nitric acid and sulphate of soda in solution, whence the ores, after saturation in this solution, are automatically elevated into a heating and drying chamber, where they are subjected to crushing-rollers, and passed to a bath of molten lead, where the metallic portions of the ore amalgamate with the lead, while the *detritus* floats upon its top, whence it is removed.

To carry out the objects of my invention I construct a cupola or roaster, A, being in this example shown as an iron cylinder placed on end, having a door, $a$, to introduce the ores and fuel, and a door, $b$, at the bottom, to permit the roasted ores to be removed. A blowpipe, B, connected with a fan or bellows at the engine, serves to supply the cupola or roaster A with the blast necessary to produce active combustion in the roaster. The roaster is so divided as to permit a heating-chamber, C, to occupy its upper portion. A pipe, D, containing a fan, E, passes from the roaster beneath the chamber C into a water-tank, F, so that in treating the ores containing precious metals any particles that may be volatilized will be condensed in the tank, for the current of air and gases passing into and from the roaster will be sufficient to force its way through the water in the tank F and escape in a purified condition from its surface, while the metallic particles will remain at the bottom of the tank.

In order to properly collect all the light particles of the precious metals that may be driven off from the ores in the roaster A or heating-chamber C, I provide the following means for mingling vapor with the heated products passing from both: by introducing a pipe, $c$, into the pipe D, that conveys the waste steam from the engine, and a pipe, $d$, which passes from the chamber C to the pipe D, and the vapor passing thus into the pipe D is condensed in the tank. The chamber C is closed at the top, save where it receives a pipe, $e$, connected with a conveyer-tube, G, that extends to the lower vat, $f'$, of the series $f$, $f'$, and $f''$, for a purpose that will be hereinafter described. The chamber C has a corrugated closed bottom, $g$, having a central opening, $h$, into a pipe, $i$, that terminates in the valve-chamber H, which communicates with the amalgamating-tub I.

A rod, $k$, having a pulley, $l$, on its top, terminates on two cross-bars, $m$ and $n$, the former carrying scrapers or stirrers O, so arranged as that their rotation will conduct the ores on the corrugated bottom $g$ to the center opening, while the latter carries rollers $p$, that rotate upon the bars and crush the ores resting on the corrugated bottom $g$ of the chamber C. The rod $k$ may have a journal in the center of the top of the chamber C, and a raised bracket, $q$, may serve to support it vertically, so that its arms shall be horizontally rotated, while it is free to rise and fall perpendicularly with the varying quantity of ore on the corrugated bottom of the chamber C.

The pans or vats $f$, $f'$, and $f''$ are so placed on proper supports that the contents of the upper will naturally flow into the lower vats in succession, the upper one being so situated as to permit the roasted ores to be drawn from the roaster directly into it, and the other so that the separate charges from the roaster may be accommodated in separate vats, where the ores are to remain in a solution of sulphate of soda and nitric acid until fully saturated with the solution, which saturation is fully completed in the lower pan or vat, $f$, whence the solution is withdrawn, and the ores, after being properly drained, are raised by the elevators $r$, moving in the direction of the arrows, to pipe c and deposited on the corrugated bottom of the drying-chamber C.

The pipe i terminates in the valve-chamber H, on the upper side of the valve s, as seen in Fig. 4. This valve has two openings, 1 2, on opposite sides of the plate, and is fastened centrally on a valve-rod, t, that receives a motion of rotation from a cone-pulley, u. A pipe, v, passes from the valve-chamber to the amalgamator, and terminates directly in the guide-trough K of the stirrers or carriers L, while its upper end is situated on the under side of the valve-plate, and on the side of the valve-chamber, at a right angle to the mouth of the pipe i. Thus, as the valve-plate s rotates, the ore from the chamber C passes into the amalgamator without permitting the escape of air from the chamber C into the lead bath I, for the rotation of the valve only leaves one of the pipes, i or v, open at a time.

The amalgamator consists of a lead-bath tub, I, placed centrally in a shell or furnace, X, in which 3 is the ash-pit and 4 the fire-chamber, having grate-bars 5 and a door, 6, for the introduction of fuel, all placed above a waste-chamber, 7, in which the residuum from the ores are received, and from which the waste is removed through the door 8. The products of combustion pass from the fire-box through flues 9, formed in a cone shape, by partitions 10, between the case X and the lead-bath tub, to the chamber 11, surrounding the bath-tub and occupying the whole space between it and the upper part of the shell or furnace X. From this chamber 11 the products of combustion pass through the pipe 12 to a flue, 13, which passes on two sides of the reservoir Y, and escape at the pipe 14, the reservoir Y being to contain molten lead to be used in the bath as required for amalgamation, and from which the lead in a melted condition flows to the amalgamator through the pipe 24, regulated by a stop-cock.

The partitions 10, between the bath-tub I and the furnace X leave inverted-cone spaces 15 between the smoke-flues, through which the residuum from the surface of the lead in the bath-tub passes to the waste-chamber 7, through the pipes 16, in which the inverted-cone spaces terminate. These pipes would be liable to admit cold air to the bath-tub if always left open; but to prevent this I have introduced plugs 17, attached to rods 18, that prevent the passage of cold air when the door 8 is opened to remove the residuum, and when the door 8 is closed the plugs 17 are raised to permit the residuum a free escape into the waste-chamber.

The pulverized ores, being lighter than the lead in the bath, it is evident would rest on the surface of the bath and only permit a limited amalgamation, unless so forced into the mass of molten lead as to expose every particle of the ores to a direct contact therewith. To effect this thorough mixture of the ores with the lead I have invented a series of hinged stirrers, L, that are secured to the shaft 19 by a flexible joint at their inner ends. The shaft 19 terminates in a cone-pulley, 20, which carries a driving-pulley, 21, to impart motion to the stirrers. The outer ends of the arms L of the stirrers terminate in paddles and move spirally in a guide-trough, K, secured in a spiral direction to the inner wall of the bath-tub I, and the paddles are conducted in the proper curve to enter the trough in succession by a guide-bar or wire, 22, of the required curvature. The cone-pulley 20 is in a reverse position to the cone-pulley n, and the latter is driven by the former through a belt, 23, the position of which can be varied at pleasure to preserve the proper relative movement between the stirrers and the valve, and thus regulate the supply of crushed ores to the lead as rapidly as the amalgamation can be effected.

The operation is this: The vats $f\ f'\ f''$ being supplied with a proper solution of nitric acid and sulphate of soda of the strength adapted to the ores under treatment, and the crude ores being, with the necessary fuel, placed in the cupola, and the reservoir and the bath supplied with lead, the fires in the furnace and in the cupola, the engine being in motion, my process will progress as follows: The roasted ores will be removed in an intense heat into the vats containing my solution, when the niter combines with the sulphur and passes off in a sulphureted gas, leaving the ore in a porous and friable condition, intimately mixed with the sulphate of soda. The ore is drained and passed to the last vat of the series, whence it is transferred by the elevators to the heating and drying chamber, on the bottom of which it is crushed by the rotation of the rollers, and conducted by the scrapers to the pipe, through which it is transferred to the bath, and there mixed by the stirrers until all the precious metals contained in the ore are intimately amalgamated with the lead, and the residuum passes to the waste-chamber.

It is proper to remark that as the ores are reheated on the floor of the drying-chamber the expansion of the sulphate of soda, in assuming a crystalline form, serves to render the disintegration of the ore by the rollers easy, rapid, and perfect.

What I claim as my invention, and desire to secure by Letters Patent, is—

1. The process herein described for separating the precious metals from ores and amalgamating them, as set forth.

2. The combination of a cupola, a series of saturating-vats, and an elevator, substantially as and for the purpose set forth.

3. The combination of a cupola with a heating-chamber having crushers and scrapers arranged and operating substantially in the manner and for the purpose set forth.

4. The combination of a furnace, lead bath, and reservoir arranged and operating substantially as and for the purpose set forth.

5. The stirrers L, combined with the guide-trough K, substantially as and for the purpose set forth.

6. Passing the products of combustion escaping from the cupola and heater through an exhaust-pipe kept charged with moisture into a reservoir of water, substantially in the manner and for the purpose set forth.

In testimony whereof I have hereunto subscribed my name.

JOHN H. ELWARD.

Witnesses:
  EDM. F. BROWN,
  WM. D. BALDWIN.